Oct. 31, 1961     H. W. CHRISTENSON ET AL     3,006,199
TORQUE TRANSMITTING MECHANISM
Filed March 14, 1956
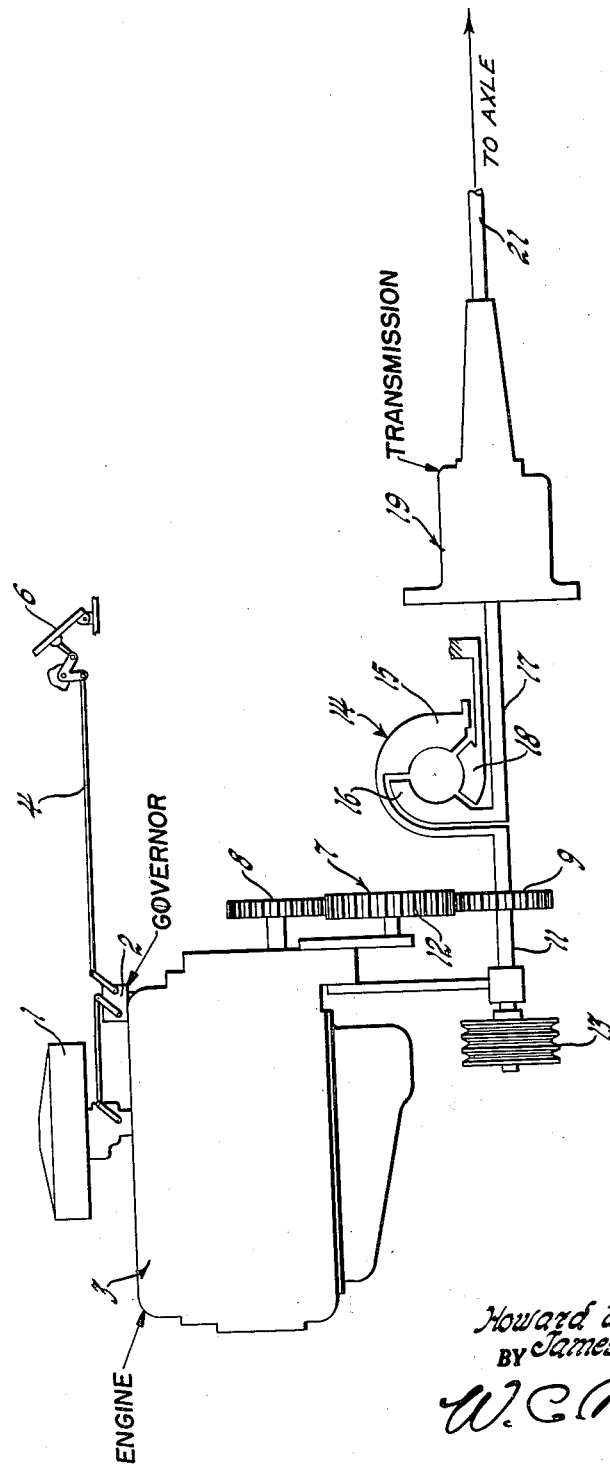
INVENTORS.
Howard W. Christenson &
BY James F. Mooney, Jr.
W. C. Middleton
ATTORNEY

3,006,199
TORQUE TRANSMITTING MECHANISM

Howard W. Christenson and James J. Mooney, Jr., Indianapolis, Ind., assignors to General Motors Corporation, Detroit, Mich., a corporation of Delaware
Filed Mar. 14, 1956, Ser. No. 571,423
5 Claims. (Cl. 74—15.84)

This invention relates in general to torque transmitting mechanisms for motor vehicles and particularly to torque transmitting mechanisms for those vehicles requiring plural power paths to operate various units in addition to driving the vehicle.

Heretofore, in certain type vehicles having special tools or equipment, such as combines, forage harvesters, bailers, etc., it has been customary to use a single power plant to drive both the vehicle over the ground and the special tools. One problem, if the vehicle encounters driving resistance; for example, rocks, mud or hills, is that not only the vehicle slows down but also the special tools.

With this problem in mind, the invention, as one of the main objects, seeks to provide a torque transmitting mechanism for a vehicle that will drive the vehicle and simultaneously provide torque for continuously driving the special tools regardless of changes in loads affecting vehicle movement.

More specifically, an object of the invention is to provide a slipping connection in the vehicle driving power path and a non-slipping connection in the power take off path for continuously driving the special equipment.

A correlative object is to provide a ratio changing device in combination with the slipping connection to drive the vehicle at variable speeds and to provide a continuous drive means for driving the special tools at a constant speed.

The foregoing and other objects and advantages of the invention will be more apparent from the following description and from the accompanying drawing in which a diagrammatic view of a plural power path torque transmitting mechanism is shown.

In the drawing a fuel feed device or carburetor 1 coacts with an engine driven governor 2 to control the speed of a prime mover or engine 3 through suitable linkage 4 and a manually operated throttle control, such as a pedal 6. By maneuvering the pedal 6 the governor setting can be adjusted to control the fuel feed device 1 and accordingly vary the engine speed. Furthermore, with this arrangement, the governor can be maintained in a fixed position corresponding to some predetermined speed.

Drive from the engine 3 is through suitable gearing 7 comprising a drive gear 8 connected to the engine, a driven gear 9 connected to a power shaft 11 and an idler gear 12 rotatably mounted for engagement with the gears 8 and 9. This gearing 7 may be arranged to provide a step-up or a step-down in the drive ratio between the engine 3 and the power shaft 11 or a 1 to 1 drive if desired.

One end of the power shaft 11 drives an attached power transmitting device, as driven pulley 13, to provide a power path for driving special tools or equipment (not shown). To drive these special tools at a constant speed a fixed relation between the speeds of the tools and the engine must be maintained by a continuous drive means; for instance, the positive connection between the gearing 7 and the pulley 13 provided by the power shaft 11 or a friction drive connection such as a releasable clutch. The other end drives a torque limiting coupling that will slip under a predetermined maximum load. Preferably this coupling is a conventional hydrodynamic drive device or torque converter 14 having a pump 15 connected to the power shaft, a turbine 16 connected to an intermediate shaft 17 and a stator 18 suitably grounded as to a vehicle frame (not shown). The intermediate shaft 17 is connected to drive a variable speed transmission 19, which is connected to a propeller shaft 21 associated with vehicle wheels (not shown). The transmission 19, either operated manually or automatically, includes any suitable clutch device for interrupting drive to the vehicle wheels.

It is important that the torque converter 14 be of limited capacity to transmit only a portion of the torque delivered by the engine 3 to the power shaft 11; for example, 1/3 to 1/2, so that extreme road load or resistance, as when the vehicle is climbing a steep hill, will not stop the drive of the tool. Even if the vehicle stalls the tool keeps going, and at constant speed. If sufficient torque is not available at the wheels to overcome this extreme road load, then the transmission 19 should be changed to a lower speed ratio.

With this plural power path arrangement a predetermined torque, an amount equivalent to the difference between engine torque delivered to the power shaft 11 and the torque converter capacity, will always be available for driving the pulley 13. Because the engine 3 runs at a constant speed, the pulley 13 will also run at a constant speed. Therefore, when this transmitting mechanism is applied to a farm implement, such as a combine, the driven pulley 13 could be used to drive the thrashing and bailing units at a constant speed determined by the pre-setting of the governor 2 by the pedal 6. Since these units are not subject to road loads or any other outside resistance, the torque required will be constant and accordingly speed regulation will be facilitated. Movement of the vehicle will be controlled by the transmission 19 and the torque converter 14 so that when the vehicle starts to slow down, the transmission 19 can be manually or automatically shifted to a more suitable gear ratio.

We claim:

1. In a power system provided with an engine capable of developing a certain maximum engine torque, the combination of means operating the engine at a constant speed uninfluenced by load changes, and a pair of drive trains arranged to receive and transfer torque from the engine, one of the drive trains requiring a predetermined torque for relatively constant speed operation, the other of the drive trains including a hydrodynamic torque transmitting device constructed and arranged to transfer a maximum torque not greater than the difference between maximum engine torque and the predetermined torque required by said one of the drive trains so that said one of the drive trains is always operated at a relatively constant speed uninfluenced by the load on said other of the drive trains.

2. In a vehicle driven by an engine capable of developing a certain maximum engine torque, the combination of a governor for maintaining the speed of the engine relatively constant with load changes, a power shaft adapted to have a positive drive connection with the engine, a hydrodynamic torque transmitting device drive connected to the power shaft for driving the vehicle, and a power takeoff device drive connected to the power shaft and requiring a predetermined torque for relatively constant speed operation, the hydrodynamic torque transmitting device being arranged and constructed to transmit a maximum torque not greater than the difference between maximum engine torque and the predetermined torque required by the power takeoff device so that the power takeoff device is operated at a relatively constant speed uninfluenced by variations in the load on the hydrodynamic torque transmitting device.

3. In a vehicle driven by an engine capable of developing a certain maximum torque, the combination of a governor for maintaining engine speed relatively constant with load changes, control means for adjusting the governor so as to afford different relatively constant engine speeds, a power shaft adapted to have a positive drive connection with the engine, a variable speed transmission for driving the vehicle, the variable speed transmission including a hydrodynamic torque transmitting device having an element thereof drive connected to the power shaft, and a power takeoff device drive connected to the power shaft and requiring a predetermined torque for relatively constant speed operation, the hydrodynamic torque transmitting device being arranged and constructed to transmit a maximum torque not greater than the difference between maximum engine torque and the predetermined torque required by the power takeoff device so that the power takeoff device is operated at a relatively constant speed uninfluenced by variations in the load on the hydrodynamic torque transmitting device.

4. In a vehicle driven by an engine capable of developing a certain maximum engine torque, the combination of a governor arranged to be driven at a speed having a constant predetermined proportion to engine speed, manually operable control means for adjusting the governor so as to afford different relatively constant engine speeds, a power shaft, gearing arranged to drivingly interconnect the engine and the power shaft, a variable speed transmission for driving the vehicle, the transmission including a hydrodynamic torque converter having an element thereof drive connected to one end of the power shaft, and a power takeoff device drive connected to the other end of the power shaft and requiring a predetermined torque for relatively constant speed operation, the torque converter being arranged and constructed to transmit a maximum torque not greater than the difference between maximum engine torque and the predetermined torque required by the power takeoff device so that the power takeoff device is operated at a relatively constant speed uninfluenced by variations in the load on the hydrodynamic torque transmitting device.

5. In a power system provided with an engine capable of developing a certain maximum engine torque, the combination of means operating the engine at a constant speed uninfluenced by load changes, and a pair of drive trains arranged to receive and transfer torque from the engine, one of the drive trains requiring a predetermined torque for relatively constant speed operation, the other of the drive trains including a torque transmitting device constructed and arranged to transfer a maximum torque not greater than the difference between maximum engine torque and the predetermined torque required by said one of the drive trains so that said one of the drive trains is always operated at a relatively constant speed uninfluenced by the load on said other of the drive trains.

References Cited in the file of this patent

UNITED STATES PATENTS

| | | |
|---|---|---|
| 1,993,983 | Woodard | Mar. 12, 1935 |
| 2,036,670 | Altgelt | Apr. 7, 1936 |
| 2,238,841 | Allgeyer | Apr. 15, 1941 |
| 2,467,077 | Brunken | Apr. 12, 1949 |
| 2,699,076 | Youngren | Jan. 11, 1955 |
| 2,727,501 | Worth | Dec. 20, 1955 |
| 2,742,792 | Lacoste | Apr. 24, 1956 |
| 2,800,037 | Czuba et al. | July 23, 1957 |

FOREIGN PATENTS

| | | |
|---|---|---|
| 487,784 | Great Britain | June 23, 1938 |
| 896,879 | France | May 8, 1944 |
| 727,699 | Great Britain | Apr. 6, 1955 |